Dec. 23, 1941.                P. A. VANCE                2,267,382
                    CORE FOR ELECTRICAL APPARATUS
                        Filed July 23, 1940
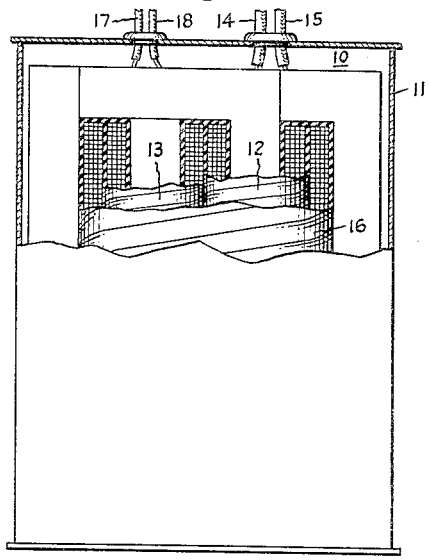
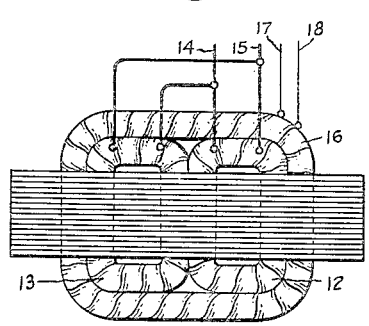
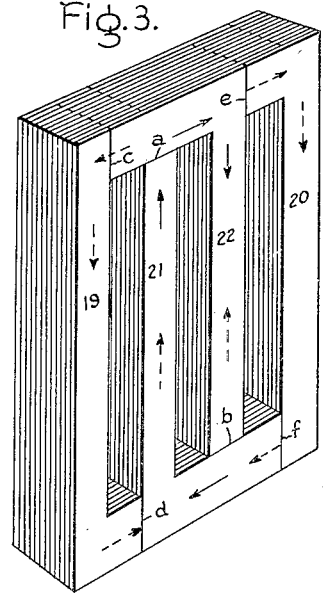
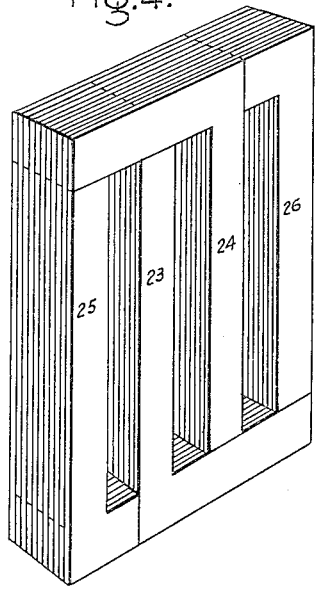
Inventor:
Paul A. Vance,
by Harry E. Dunham
His Attorney.

UNITED STATES PATENT OFFICE 2,267,382

CORE FOR ELECTRICAL APPARATUS

Paul A. Vance, Fort Wayne, Ind., assignor to General Electric Company, a corporation of New York Application July 23, 1940, Serial No. 346,904

2 Claims. (Cl. 171—242)

My invention relates to magnetic cores for electrical apparatus, such as reactors.

It has been customary to provide the cores for electrical induction apparatus with stacked laminations, each of the laminations being composed of a plurality of L-shaped punchings. The punchings have been employed since it is convenient to provide preformed coils around the core legs and then assemble the punchings together. In certain applications of reactors I have found it desirable to employ 4-legged cores, the two inner legs providing winding legs and the outer two providing with yoke members, a closed magnetic path. In assembling the L-shaped elements which have been used in the past to form a 4-legged core I found, however, that a larger number of joints fell in the flux paths than are desirable for the efficient operation of the reactor.

It is therefore an object of my invention to provide a core of the above-mentioned type for electrical apparatus, such as a reactor, which will have a minimum of joints in the flux paths.

Another object of my invention is to employ a minimum of different shapes of core elements so that the resultant core will be economical to manufacture.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is a side elevation in partial section of a 4-legged D.-C. excited A.-C. reactor which is provided with an embodiment of my invention; Fig. 2 is a top view of the core and coils of the reactor illustrated in Fig. 1; Fig. 3 is a perspective view of the core of the reactor illustrated in Figs. 1 and 2; and Fig. 4 is a modification of the reactor illustrated in Fig. 3.

According to the arrangements illustrated in the drawing I provide a laminated core with each of the laminations consisting of four L-shaped punchings. The punchings employed are of two distinct or different shapes and they are so assembled that the punchings of one shape form the outer two legs and a portion of the yoke and the two remaining punchings of the second shape are assembled to form the two inner winding legs and the remainder of the yoke. It will be noted that the yoke portion of the elements of the last mentioned shape are larger than the yoke portions of the first mentioned shape so that a minimum number of joints will be provided in the closed path which includes the winding legs and the connecting yoke portions. Thus the joints in the A.-C. flux path are reduced to two, while the joints in the D.-C. flux paths are reduced to three.

Referring to the drawing, in Figs. 1 and 2 I have illustrated a stationary induction apparatus such as a reactor having a core indicated generally by the numeral 10 and which is surrounded by a suitable casing 11. The core when assembled includes four legs, the two center legs being surrounded by A.-C. windings 12 and 13 which may be connected in either series or paralled arrangement to an external circuit through the cables 14 and 15. In order to control the saturation of the reactor I provide a coil 16 which surrounds the two A.-C. coils and which is energized from a D.-C. source through the cables 17 and 18.

In the manufacture of stationary induction apparatus it would be desirable if possible to have no joints in any of the closed flux paths. However, in order to provide a structure which may be conveniently manufactured it becomes necessary to make the core of a plurality of elements which when assembled provide a core member since it is desirable to employ preformed coils which encircle the winding legs. In order, however, to keep the exciting current to a minimum it is desirable to keep the number of joints in the flux paths to a minimum. Therefore, to accomplish this and to still provide a core which is economical to manufacture and which may be easily assembled with the coils, I have provided, as illustrated more particularly in Fig. 3, a core which includes a plurality of L-shaped elements. In the manufacture of a 4-legged core suitable for a D.-C. excited A.-C. reactor, I provide each of the laminations with four L-shaped elements 19, 20, 21, and 22. These elements are so shaped that when assembled in the position as illustrated in Fig. 3, only two joints, $a$ and $b$, will be provided in the A.-C. flux path, while three joints $a$, $c$, and $d$, and $b$, $e$ and $f$ will be provided in the two D.-C. flux paths. Thus the L-shaped elements 19 and 20 are so shaped that when assembled they provide the two outside legs and a portion of the yoke which extends from each of the outside legs to the adjacent coil legs. The elements 21 and 22, however, are so shaped that their leg portions form the coil legs and their yoke portions extend to the other coil leg and beyond to the outside leg adjacent this last mentioned coil leg. Thus it will be seen from an inspection of Fig. 3 that only two joints will be provided in the A.-C. flux path, this path being indicated by the solid line arrows. Also the joints in the D.-C. flux path will be limited to three, that is *a, c, d* and *b, e, f,* the two closed D.-C. flux paths being indicated by the dotted line arrows.

In Fig. 4 I have illustrated a modification of the core illustrated in Fig. 3. In this structure it will be seen that the L-shaped elements 23 and 24 which make up the two center coil legs have their yoke portions longer than the corresponding portions of elements 21, 22, so that they extend to the outside edge of the elements 25 and 26 which make up the two outside legs. Also these elements 25 and 26 have their legs shorter than the corresponding portions of the elements 19, 20. In this modification also it will be seen that only two joints are provided in the A.-C. flux path and three in the D.-C. flux path.

In view of the foregoing it will be seen that I have provided a core member which is economical to manufacture, magnetically efficient, and which is particularly suitable for a 4-legged D.-C. excited A.-C. reactor. Each of the laminations of this electrical apparatus is composed of two pairs of different shaped L-shaped elements and when these elements are assembled in relation as illustrated in the drawing a minimum of joints will be provided in all the closed flux paths.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. In a reactor, a core including two winding legs and two outer legs, said legs being connected by end yokes, alternating current windings surrounding each of said winding legs, a direct current winding surrounding said alternating current windings, said core being assembled of a plurality of L-shaped elements having two distinct shapes, said elements each having a leg portion and a yoke portion, said leg portion of said elements having one of said shapes forming the outer legs, said yoke portion of said last mentioned elements forming a portion of said yokes extending between said outer legs and the adjacent winding leg, said leg portion of said elements having the other of said shapes forming said winding legs, said yoke portion of said last mentioned elements forming the yokes between said winding legs and the remainder of said yokes between said winding legs and said outer legs so that there are only two joints in the closed alternating flux paths through said winding legs and connecting yokes and only three joints in the closed direct current flux path through each of said winding legs, the adjacent outer leg and connecting yoke portions.

2. In a reactor, a core having two winding legs and two outer legs, said legs being connected by end yokes, alternating current windings surrounding each of said winding legs, a direct current winding surrounding said alternating current windings, said core member being assembled of a plurality of L-shaped elements having having two distinct shapes, the elements of one of said shapes forming the outer legs, the elements of the other of said shapes forming the two winding legs and the part of said yokes between the ends of said winding legs so that there are only two joints in the closed alternating flux path through said winding legs and connecting yokes.

PAUL A. VANCE.